United States Patent [19]

Kurita et al.

[11] Patent Number: 5,583,661
[45] Date of Patent: Dec. 10, 1996

[54] METHOD OF AND APPARATUS FOR PROCESSING AN IMAGE

[75] Inventors: Syouji Kurita, Tokyo; Noboru Inamine, Sakura; Ikuo Noguchi, Ryugasaki, all of Japan

[73] Assignee: Riso Kagaku Corporation, Tokyo, Japan

[21] Appl. No.: 305,481

[22] Filed: Sep. 13, 1994

[30] Foreign Application Priority Data

Sep. 16, 1993 [JP] Japan ................................. 5-230397

[51] Int. Cl.$^6$ ........................................................ H04N 1/40
[52] U.S. Cl. ........................... 358/456; 358/448; 358/455; 358/465; 358/466
[58] Field of Search ............................... 358/456, 448, 358/465, 433, 459, 466, 455, 296; H04N 1/40

[56] References Cited

U.S. PATENT DOCUMENTS

| | | | |
|---|---|---|---|
| 4,626,923 | 12/1986 | Yoshida | 353/283 |
| 5,008,950 | 4/1991 | Katayama et al. | 382/50 |
| 5,245,678 | 9/1993 | Eschbach et al. | 382/50 |
| 5,307,426 | 4/1994 | Kanno et al. | 382/50 |
| 5,351,137 | 9/1994 | Kato et al. | 358/457 |
| 5,418,626 | 5/1995 | Semasa | 358/451 |
| 5,459,587 | 10/1995 | Fukushima | 358/462 |
| 5,488,673 | 1/1996 | Katayama | 382/270 |

FOREIGN PATENT DOCUMENTS 3408187  9/1984  Germany.

*Primary Examiner*—Kim Yen Vu
*Assistant Examiner*—Madeleine Anh-Vinh Nguyen
*Attorney, Agent, or Firm*—Kanesaka & Takeuchi

[57] ABSTRACT

An image is processed by using an error diffusion method of propagating density distribution errors in pixels around a pixel to be noted. A method includes the steps of calculating thresholds ($Th_1$, $Th_2$) of densities corresponding to the area ratio between the pixels; selecting a pixel to be noted (f) which are different in the area ratio from each other; calculating errors (E) produced in the peripheral pixels according to the distances from the peripheral pixels to the noted pixel and areas of the individual peripheral pixels; adding the propagated errors to a density of the noted pixel so as to make a rearrangement (f') on the density of the noted pixel; comparing the rearranged density of the noted pixel with the thresholds to obtain a corresponding level (G) represented in a binary form, and obtaining density distribution errors (e).

16 Claims, 12 Drawing Sheets

FIG. 8

| | 2 a | 1 b | 2 a | 1 b | m |
|---|---|---|---|---|---|
| | f(m,n) = 76 | f(m+1,n) = 102 | f(m+2,n) = 128 | f(m+3,n) = 178 | |
| | f(m,n+1) = 102 | f(m+1,n+1) = 153 | 128 | 204 | |
| | 150 | 204 | 255 | 255 | | n

FIG. 9

| | | | | m |
|---|---|---|---|---|
| f=76 G="0" e=76 | f=102 G="1" e=-50.8392 | f=128 | f=178 | |
| f=102 | f=153 | f=128 | f=204 | |
| f=150 | f=204 | f=255 | f=255 | | n

FIG. 10
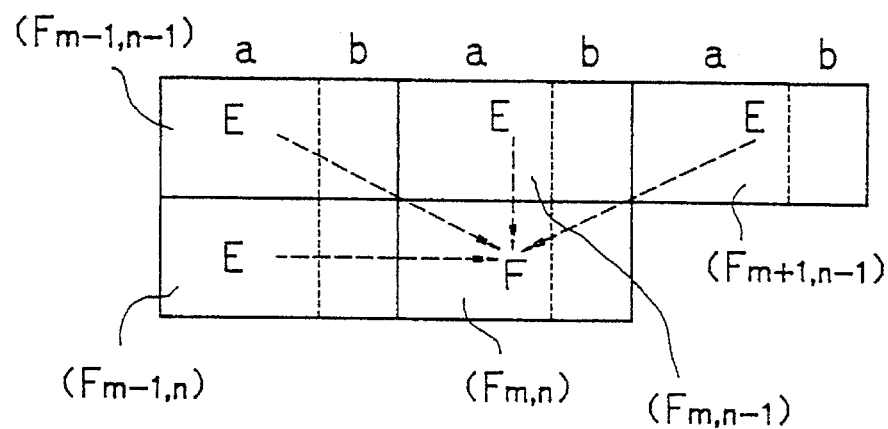
FIG. 11
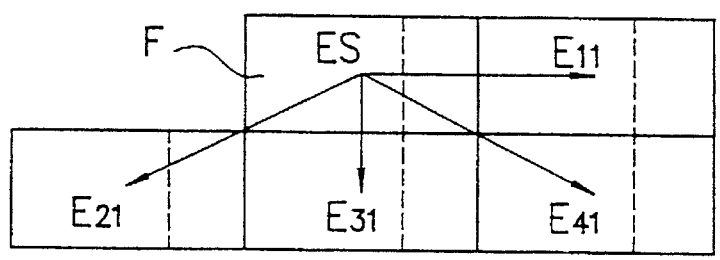
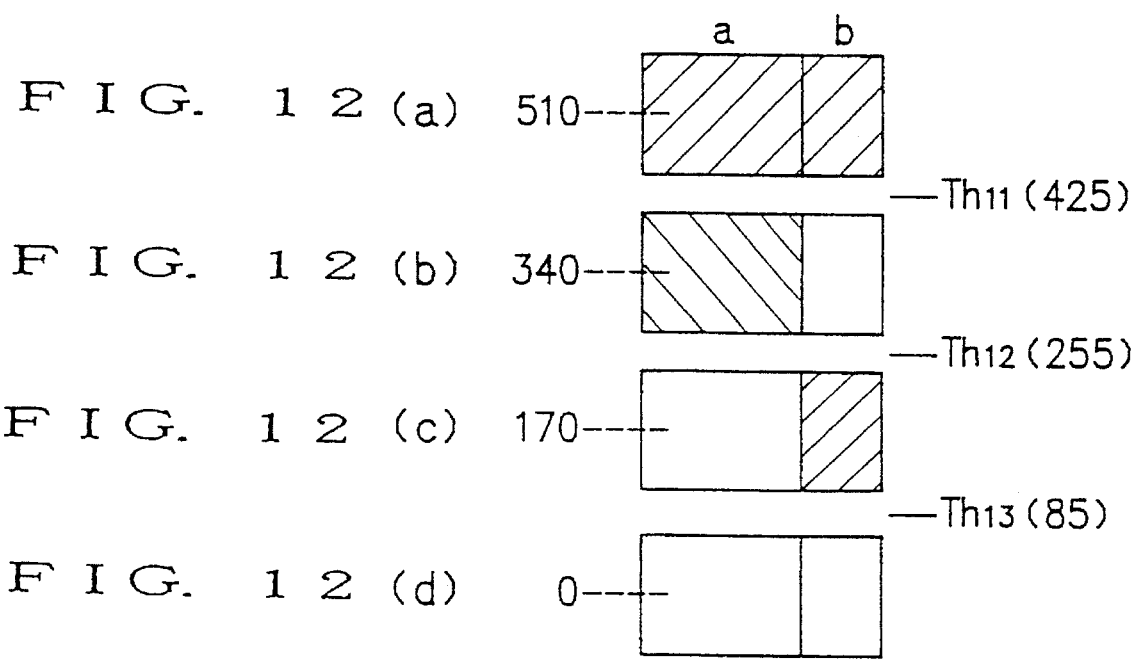
FIG. 12 (a)
FIG. 12 (b)
FIG. 12 (c)
FIG. 12 (d)

FIG. 15

| $F_{m,n}$ | | $F_{m+1,n}$ | | | |
|---|---|---|---|---|---|
| $f_{m,n}=$ 76 | $f_{m+1,n}=$ 102 | $f_{m+2,n}=$ 128 | $f_{m+3,n}=$ 178 | 150 | 143 |
| 102 | 153 | 128 | 204 | 180 | 160 |
| 150 | 204 | | | | |

FIG. 16

| F=178<br>G= "2"<br>E= 8 | F=306<br>G= "3"<br>E=−31,34 | | |
|---|---|---|---|
| g = "0" \| "1" | g = "1" \| "0" | | |

METHOD OF AND APPARATUS FOR PROCESSING AN IMAGE

BACKGROUND OF THE INVENTION

1. Field of the Invention

The present invention relates to a method of and an apparatus for processing an image, wherein errors between the actual image and expressed image produced in a plurality of pixels forming the image are computed and processed.

2. Description of the Related Art

Each of originals is read or scanned by a scanner unit having an image sensor such as a CCD (Charge Coupled Device) or the like. After data read from the original has been subjected to image processing by an image processing unit, the so-processed data can be printed on a recording sheet by a printing unit such as a TPH (Thermal Print Head) or the like.

A system has been generally used wherein upon printing, a thermal head is moved in a main scanning direction and sub-scanning is performed by feeding a recording sheet.

FIG. 18 shows a thermal head 50 attached to a printing unit, for performing thermal printing. Adjacent heating elements 51 are formed so as to be identical in size to each other. Thus, the image processing at the step prior to the printing is performed as the image processing based on pixels identical in size (area) to each other.

Further, the recording of data on the recording sheet is carried out by selectively driving the respective heating elements of the thermal head. Described specifically, upon image processing, the respective heating elements are energized or de-energized under drive control executed in a binary form to thereby form predetermined characters and images.

When an original, a picture or the like has multi levels of gray in density, the multi levels of halftone can be reproduced on a recording sheet at high gradation by using an error diffusion method in the image processing.

The error diffusion method is used for the purpose of determining errors to be propagated to a pixel to be noted from peripheral pixels to obtain the errors to be propagated to the noted pixel and using the errors to make a decision about the degree of halftone of the noted pixel to thereby achieve high tonal characteristics.

When the decision about the tone of the noted pixel is finally made, a middle density or level in multi levels of tone is set as a threshold, for example and the density of the noted pixel, which is added with the errors, is expressed in a binary form depending on whether the density is higher or lower than the threshold.

Since, however, the conventional thermal head 50 comprises the heat elements 51 identical in size to each other, tones representable by the adjacent two heating elements are limited to three levels of tone. Therefore, the conventional thermal head becomes complicated in structure and is increased in scale to show multi levels of halftone.

Thus, a thermal head 60 constructed so that adjacent heating elements are alternately varied in size as shown in FIG. 19 has been known. According to the thermal head 60, the adjacent heating elements 61 and 62 are different in heating value from each other. Therefore, four levels of halftone can be expressed in total by the adjacent two heating elements 61 and 62, so that multi levels of halftone can be easily produced.

However, an image processing method, which is performed using an error diffusion method using the thermal head 60, has not yet been proposed.

Namely, it is necessary to perform image processing for the thermal head 60 as well as to use the aforementioned thermal head 60 in order to exhibit a higher tonal characteristic.

However, there has heretofore been proposed only image processing utilizing the error diffusion method used with the thermal head comprised of the heating elements identical in size to each other. This is because distances between the noted pixel and its peripheral pixels may simply be considered due to the fact that the heating elements are identical in size to each other.

Thus, the thermal head 60 comprised of the noted pixels (heating elements) having the two types of sizes cannot cope with or treat the image processing in case the error diffusion method based on the distance between the respective heating elements 61 and 62 alone is used.

SUMMARY OF THE INVENTION

The present invention has been made in view of the foregoing. It is therefore an object of the present invention to provide a method of and an apparatus for processing an image, wherein high tonal characteristics can be expressed in an image formed by two types of adjacent pixels different in size from each other using a novel error diffusion method.

Each of heating elements of a thermal head can be optimally controlled by the image processing so that high levels of halftone can be produced on a recording sheet.

In order to achieve the above object, the present invention provides an image processing method using a so-called error diffusion method, wherein a density of a pixel to be noted in an image formed such that pixels (a, b) thereof adjacent to each other in a scanning direction are different in area from each other is determined as a binary form based on combinations of the density of the noted pixel and densities of a plurality of pixels provided on the periphery of the noted pixel.

An image processing method in a first aspect comprises the following steps of: calculating thresholds (Th1, Th2) of densities corresponding to area ratio of the pixels; selecting, as a pixel to be noted (f), one (a or b) of the adjacent pixels, which are different in area ratio from each other; calculating errors (E) produced in the peripheral pixels and propagated to the noted pixel (f), according to distances from the individual peripheral pixels to the noted pixel and areas of the peripheral pixels; adding each of the propagated errors to a density of the noted pixel so as to make a rearrangement or correction (f') on the density of the noted pixel; comparing the rearranged density of the noted pixel with the threshold of the noted pixel so as to obtain a corresponding level (G) represented in a binary form; and obtaining density distribution error (e) based on the rearranged density (f') of the noted pixel, the area ratio of the noted pixel relative to the adjacent pixels and the level (G) represented in the binary form.

An image processing method in a second aspect comprises the following steps: calculating thresholds ($Th_{11}$ through $Th_{14}$) of densities of the predetermined two pixels (a, b) situated adjacent to each other according to combined patterns of the densities thereof; selecting a pair of the adjacent pixels (a, b) as a noted pixel block (F) which is a combination of the adjacent two pixels; calculating errors (ES) produced in the peripheral pixels, which are propagated to the noted pixel block (F), according to distances from the peripheral pixel blocks to the noted pixel block; adding each of the propagated errors to a density of the noted pixel block so as to make a rearrangement or correction (F') on the density of the noted pixel block; and comparing the rearranged density of the noted pixel block with the thresholds to thereby obtain a binary level for the noted pixel block and new density distribution errors (E) corresponding to the combined patterns of the densities of the respective pixels in the noted pixel block.

Further, the present invention provides an image processing apparatus using an error diffusion method, wherein density distribution errors produced in pixels around a pixel to be noted (f) in an image are propagated to the noted pixel in the binary form. The image has adjacent pixels (a, b) extending in a main scanning direction different in area from each other.

An image processing apparatus in a third aspect is an apparatus for executing the image processing method as defined in the first aspect and comprises noted pixel selecting means (5) for successively selecting one of the pixels (a, b) as a pixel to be noted based on an image scanning signal and outputting a corresponding select signal (S1); weight coefficient setting means (7) for computing weight coefficients with respect to the noted pixel and the respective peripheral pixels, based on areas of the respective adjacent pixels (a, b) and distances from the noted pixel to the respective peripheral pixels and outputting weight coefficients ($K_1$ through $K_4$) corresponding to the respective noted pixels in response to the select signal outputted from the noted pixel selecting means; threshold calculating means for calculating thresholds of densities for selecting binary level of the respective pixels according to the area ratio between the adjacent pixels, and computing and outputting thresholds ($Th_1$, $Th_2$) corresponding to the respective noted pixels in response to the select signal; propagation error calculating means (10) for computing errors (E) produced in the peripheral pixels, which are propagated to the noted pixel (f), based on the weight coefficients outputted from the weight coefficient setting means; rearranging means (15) for adding each of the propagated errors to a density of the noted pixel so as to effect a rearrangement or correction (f') on the density of the noted pixel; binary digitizing means (17) for comparing the rearranged density of the noted pixel with each of the thresholds ($Th_1$, $Th_2$) outputted from the threshold calculating means so as to produce a corresponding level (G) represented in the binary form and selecting and outputting a signal (S2) represented in the binary form, corresponding to the pixels (a, b); and density distribution error calculating means (19) for obtaining density distribution errors (e) corresponding to the respective pixels to be noted, based on the density (f') rearranged by the rearranging means, the digitized levels produced from the binary digitizing means (17) and the area ratio between the adjacent pixels and outputting a density distribution error signal (S3) corresponding to the respective pixels (a, b).

Further, an image processing apparatus in a fourth aspect is an apparatus for executing the image processing method of the second aspect and comprises noted pixel selecting means (5) for selecting a set of adjacent pixels (a, b) as a noted pixel block based on an image scanning signal, and outputting a select signal (S1) corresponding to the selected set of pixels; weight coefficient setting means (7) for computing and outputting weight coefficients ($K_{11}$ through $K_{14}$) with respect to the respective peripheral pixel blocks from the noted pixel block, based on distances from the noted pixel block and to the respective peripheral pixel blocks; threshold calculating means (12) for computing and outputting a plurality of density thresholds ($Th_{11}$ through $Th_{13}$) according to the density of the noted pixel block; propagation error calculating means (10) for calculating errors produced in the peripheral pixel blocks, which are propagated to the noted pixel block (F), based on the weight coefficients outputted from the weight coefficient setting means; rearranging means (15) for adding each of the propagated errors to a density of the noted pixel block so as to make a rearrangement (F') on the density of the noted pixel block; quaternary forming means (16) for comparing the rearranged density with each of the thresholds outputted from the threshold calculating means, and selecting and outputting a signal (S4) represented in quaternary form, which is indicative of a quaternary-formed level (G) of the noted pixel block; binary digitizing means (17) for selecting and outputting a signal (S2) represented in the binary form, which is indicative of digitized levels of the pixels (a, b), based on the signal (S4) outputted from the quaternary forming means; and density distribution error calculating means (19) for calculating density distribution errors (E) corresponding to the respective pixel blocks, based on the density (F') rearranged by the rearranging means and the quaternary-formed level (G) outputted from the quaternary forming means (16) and outputting a density error signal (S3) based on the result of calculation.

According to the image processing method and apparatus, the noted pixel selecting means (5) successively selects the pixels (a, b) adjacent to each other in the main scanning direction and different in area from each other as the noted pixel (f) in response to the scanning signal.

The propagation error calculating means (10) determines each of the errors (E) produced at the peripheral pixels, which are propagated to the noted pixel (f), based on multiplication of the product of the density distribution errors ($e_{m-1,n-1}$ through $e_{m-1,n}$) calculated from the density distribution error calculating means (19) and the weight coefficients ($K_1$ through $K_4$) produced from the weight coefficient setting means.

Thereafter, the rearranging means (15) adds each of the propagated errors (E) to the density of the noted pixel (f) so as to rearrange (f') the density of the noted pixel (f).

The binary digitizing means (17) compares the rearranged density with each of the thresholds ($Th_1$, $Th_2$) outputted from the threshold calculating means (12) so as to obtain the binary digitized level (G).

Thereafter, the density distribution error calculating means (19) can obtain the density distribution errors (e) with respect to each of the noted pixels (f) based on the area ratio between the respective noted pixels (f) adjacent to each other, the rearranged density (f') and the digitized level (G).

BRIEF DESCRIPTION OF THE DRAWINGS

FIG. 8 is a view for describing specific states of densities of the respective pixels employed in the first embodiment shown in FIG. 3;

FIG. 9 is a view for explaining the result of specific computation obtained in the first embodiment shown in FIG. 3;

FIG. 10 is a view typically showing the layout of pixels represented in block units to describe a block method showing a second embodiment of the present invention;

FIG. 11 is a view for describing the dispersion of density distribution error produced in a pixel to be noted, which is employed in the second embodiment, into peripheral pixels;

FIGS. 12(a) through 12(d) are respectively views for describing density representations of four patterns which are combinations of pixels in adjacent block units and respectively show thresholds employed in the second embodiment;

FIG. 15 is a view for describing specific states of densities of respective pixels employed in the second embodiment shown in FIG. 13;

FIG. 16 is a view showing the result of specific computation obtained in the second embodiment shown in FIG. 13;

DETAILED DESCRIPTION OF THE PREFERRED EMBODIMENTS

A first embodiment of the present invention will hereinafter be described. The first embodiment is called an "area method", which computes or calculates density distribution error for each pixel.

Figure 1:
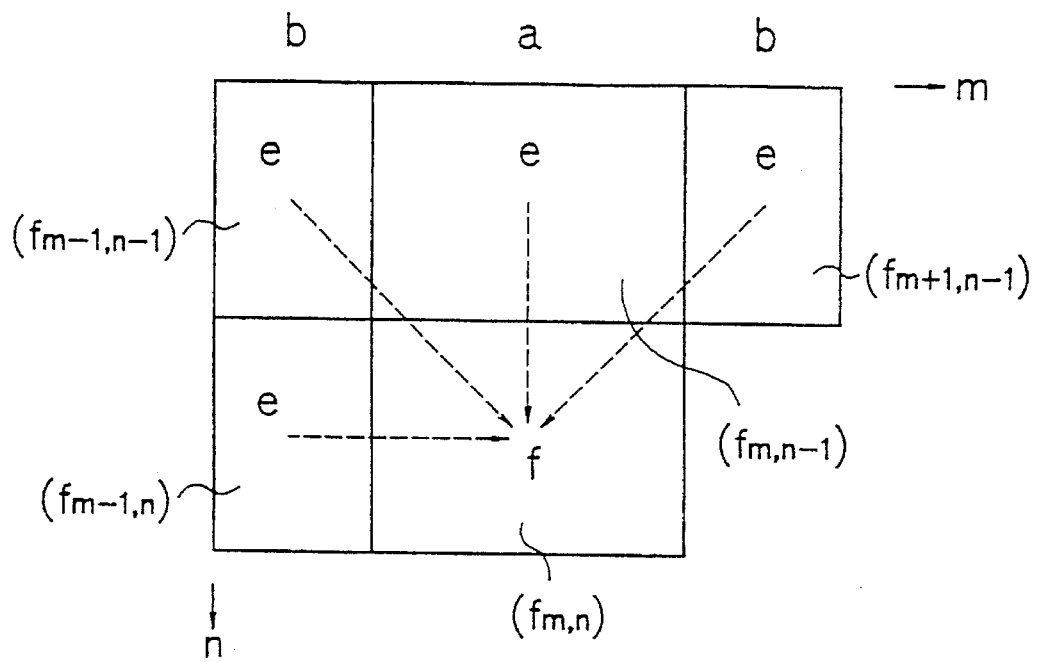
FIG. 1 is a view typically showing the layout of pixels at the time that a pixel a (fm, n) having a large area ratio is taken as a pixel to be noted in order to describe an area method showing a first embodiment of the present invention.
Figure 2:
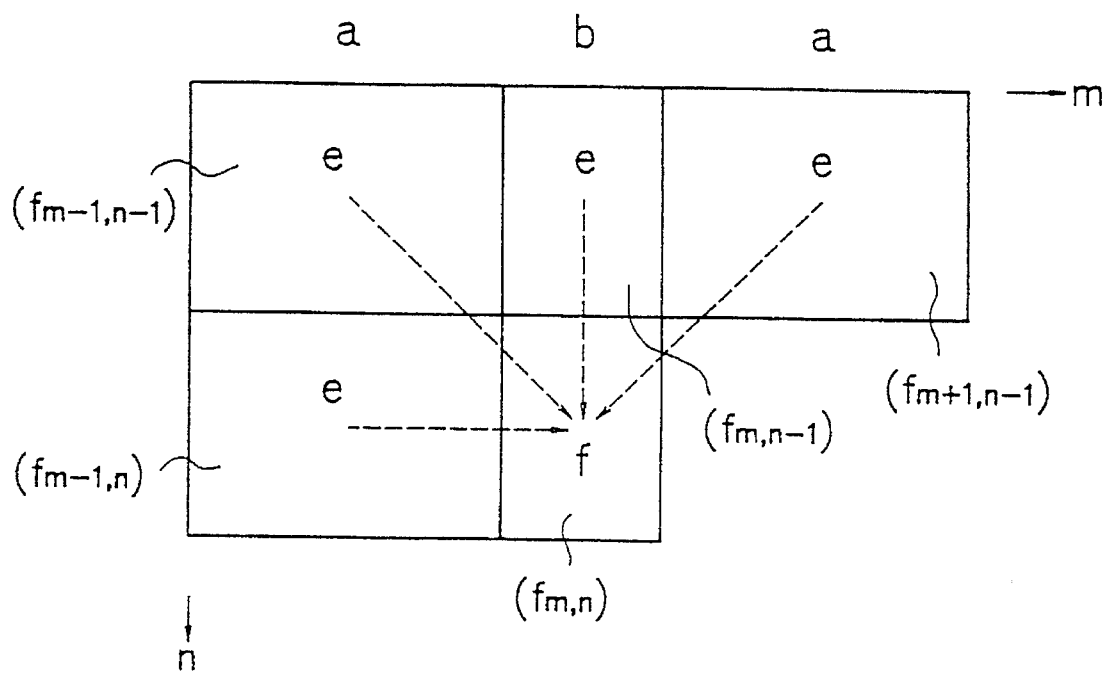
FIG. 2 is a view typically illustrating the layout of the pixels at the time that a pixel b (fm, n) having a small area ratio is taken as a pixel to be noted in the first embodiment shown in FIG. 1.

FIGS. 1 and 2 are respectively views typically showing parts of pixels in an image corresponding to the thermal head 60.

The pixels are provided so as to have a width ratio of a:b (2:1 in the same drawings). Further, the pixels are provided adjacent to each other and disposed alternately with respect to a main scanning direction. Now, a+b is defined as 2 (i.e. a+b=2) from the relationship of a>b.

Incidentally, the horizontal direction shown in the drawing corresponds to the main scanning direction, i.e. the direction of arrangement or layout of a CCD, a thermal head, etc., whereas the vertical direction in the drawing corresponds to a sub scanning direction, i.e. the direction of feeding an original, a recording paper, etc.

Two kinds of pixels a and b different in width from each other are successively set as pixel f to be noted upon scanning. As a result, two pixel layouts or arrangements (CASES1 and CASE2) are formed which represent a state (see FIG. 1) in which the pixel a is taken as the pixel f to be noted and a state (see FIG. 2) in which the pixel b is taken as the pixel f to be noted. Peripheral pixels $f_{m-1,n-1}$, $f_{m,n-1}$, $f_{m+1,n-1}$, $f_{m-1,n}$ are respectively interchanged according to the different pixel arrangements.

As shown in FIGS. 1 and 2, the peripheral pixels $f_{m-1,n-1}$ through $f_{m-1,n}$ shown in FIGS. 1 and 2 are arranged at four positions including three positions where the three peripheral pixels exist on a first scanning line as seen in the main scanning direction and one position where the remaining peripheral pixel exists on a second scanning line. Namely, the pixel f to be noted and the peripheral pixels $f_{m-1,n-1}$ through $f_{m-1,n}$ with respect to the noted pixel f are set based on the fact that density distribution errors $e_{m-1,n-1}$, $e_{m,n-1}$, $e_{m+1,n-1}$, $e_{m-1,n}$ with respect to these peripheral pixels $f_{m-1,n-1}$, $f_{m,n-1}$, $f_{m+1,n-1}$, $f_{m-1,n}$ are transmitted or propagated to their corresponding noted pixel $f(f_{m,n})$ at a scanning end (corresponding to a second pixel on the second scanning line).

Thus, when the pixel f to be noted is brought to a third pixel on the second scanning line in the main scanning direction by scanning, the peripheral pixels $f_{m-1,n-1}$ through $f_{m-1,n}$ are shifted in a manner similar to the pixel f to be noted.

Figure 3:
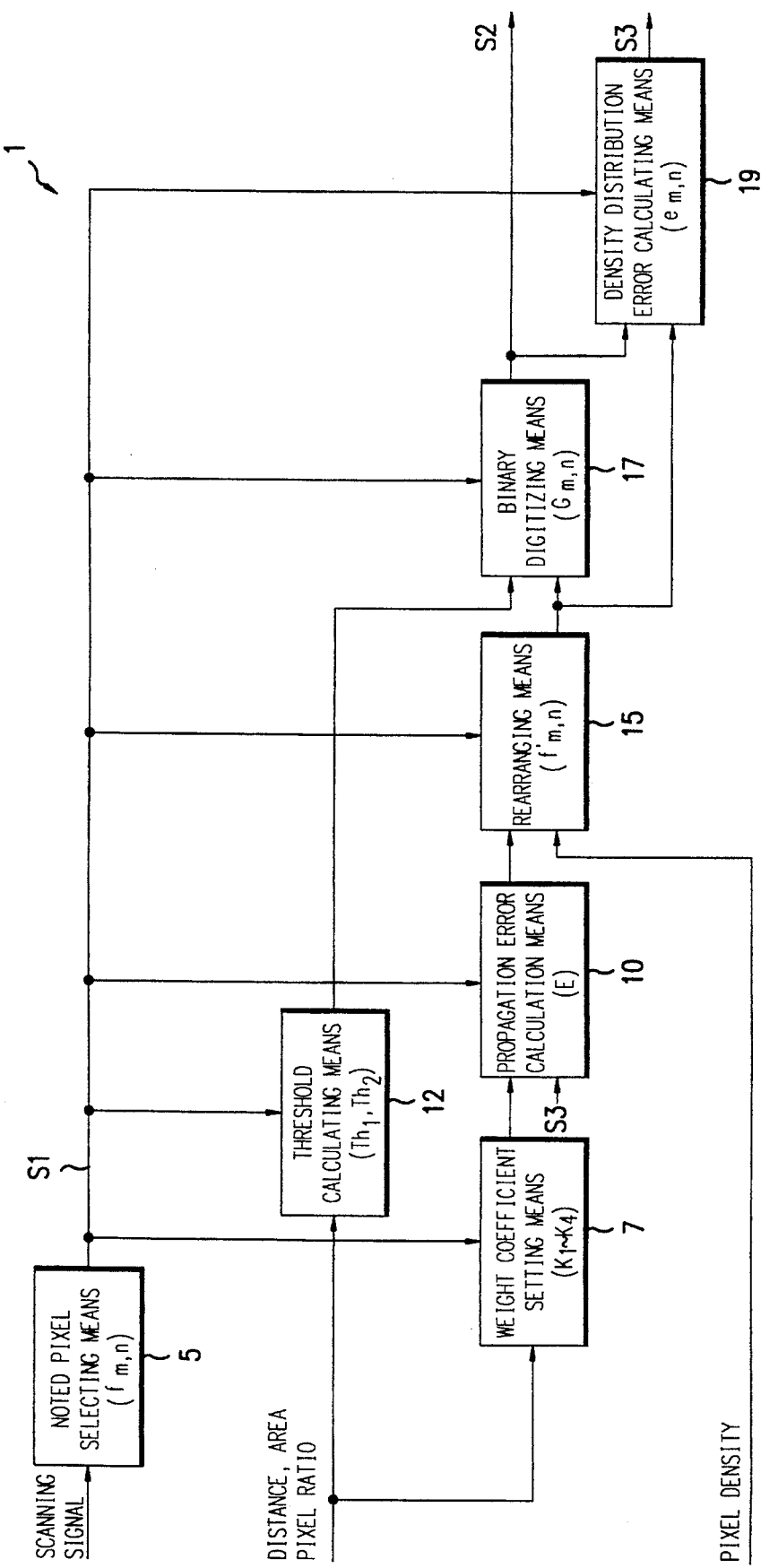
FIG. 3 is a block diagram showing the structure of the first embodiment of an image processing apparatus according to the present invention.

Next, FIG. 3 is a block diagram showing the structure of an image processing apparatus 1 of the present invention. An image scanning signal is inputted to a noted pixel selecting means 5. The noted pixel selecting means 5 detects whether a pixel $f_{m,n}$ (where m shows a row, which extends in the main scanning direction and n shows a column thereof, which extends in the sub scanning direction) to be noted, which changes momentarily according to the scanning signal, corresponds to either one of pixels a or b. Thereafter, the noted pixel selecting means 5 outputs a select signal S1 indicative of the one of the corresponding pixel arrangements CASE1 and CASE2 to each of the components of the image processing apparatus 1.

A weight coefficient setting means 7 is supplied with information about distances from the center of the noted pixel f, i.e., $f_{m,n}$ to the centers of the respective peripheral pixels $f_{m-1,n-1}$ through $f_{m-1,n}$, the areas of the pixels a and b, and pixel area ratios. Thereafter, the weight coefficient setting means 7 sets weight coefficients $K_1$ through $K_4$ for the density distribution errors $e_{m-1,n-1}$ through $e_{m-1,n}$ produced in the respective peripheral pixels in accordance with the following operations and stores them therein.

A description will now be made of the calculation of the weight coefficients $K_1$ through $K_4$.

Figure 4:
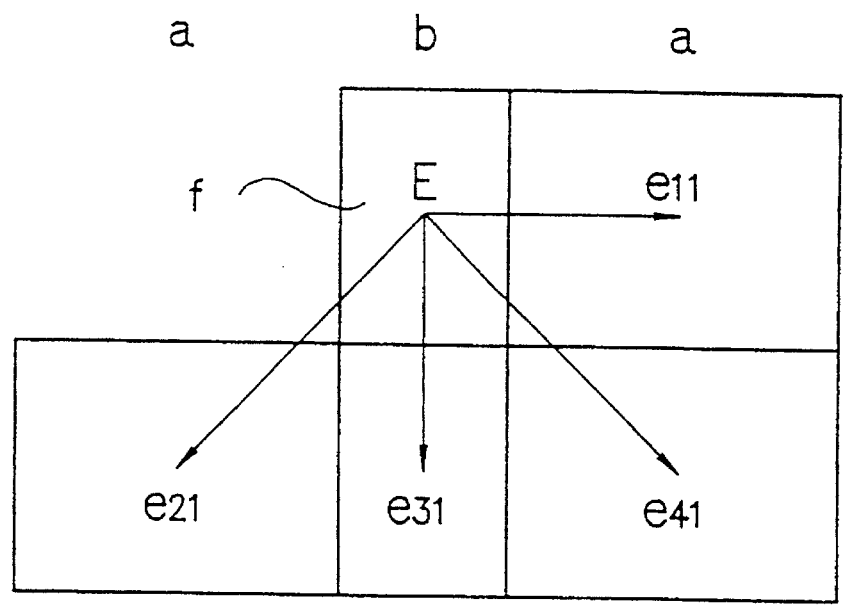
FIG. 4 is a view for describing the dispersion of density distribution error produced in a pixel to be noted into peripheral pixels when the pixel to be noted is taken as a pixel b in the first embodiment shown in FIG. 3.
Figure 5:
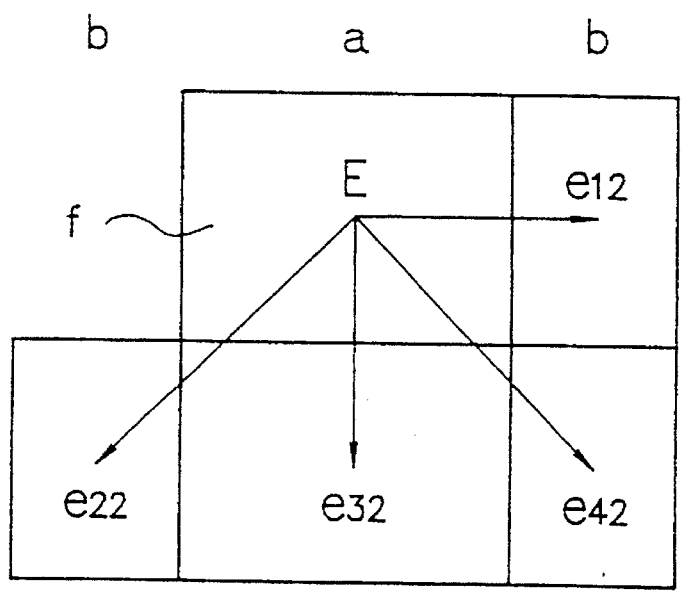
FIG. 5 is a view for describing the dispersion of density distribution error produced in a pixel to be noted into peripheral pixels when the pixel to be noted is taken as a pixel a in the first embodiment shown in FIG. 3.

FIGS. 4 and 5 respectively show cases where a pixel b is set as a pixel $f_{m,n}$ to be noted and a pixel a is set as a pixel $f_{m,n}$ to be noted. Further, FIGS. 4 and 5 respectively illustrate the manner in which density distribution errors produced in the noted pixels f are dispersed into their corresponding peripheral pixels $f_{m-1,n-1}$ through $f_{m-1,n}$ extending in four directions. Incidentally, the square root of 2 ($2^{1/2}$) in the following equation is taken as 1.4. Further, the area ratio, i.e. a:b, between the adjacent pixels a and b is equal to 2:1.

Thus, if weights necessary for diffusing the density distribution errors developed in the pixel $f_{m,n}$ to be noted into the four directions are considered in terms of distance in the CASE11 shown in FIG. 4, then they are represented as follows:

$$(f \text{ to } _{e11}):(f \text{ to } _{e21}):(f \text{ to } _{e31}):(f \text{ to } _{e41})=1.4:1:1.4:1$$

Further, the ratio among the areas of the respective density distribution errors is represented as $_{e11}:_{e21}:_{e31}:_{e41}=2:2:1:2$.

Thus, weight coefficients with respect to the pixels from the noted pixel f to the respective error pixels are obtained in consideration of both the distances and the areas in the following manner.

Since $B1=1.4\times2+1\times2+1.4\times1+1\times2$ it is about 8.2, f to $_{e11}=1.4\times2\div B_1$ approximates to 0.3415, f to $_{e21}=1\times2\div B_1$ approximates to 0.2439, f to $_{e31}=1.4\times1\div B_1$ approximates to 0.1707 and f to $_{e41}=1\times2\div B_1$ approximates to 0.2439.

Next, if weights necessary for diffusing errors produced in the pixel $f_{m,n}$ into four directions are considered in the CASE12 shown in FIG. 5 in a manner similar to the CASE11 in terms of distance, then they are represented as follows:

$$(f \text{ to } _{e12}):(f \text{ to } _{e22}):(f \text{ to } _{e32}):(f \text{ to } _{e42})=1.4:1:1.4:1$$

Further, the ratio among the areas of the respective errors is represented as $_{e12}:_{e22}:_{e32}:_{e42}=1:1:2:1$.

Thus, weight coefficients with respect to the pixels from the noted pixel f to the respective peripheral pixels are obtained in consideration of both the distances and the areas in the following manner.

Since $B2=1.4\times1+1\times1+1.4\times2+1\times1$ it is about 6.2, f to $_{e12}=1.4\times1\div B_2$ approximates to 0.2258, f to $_{e22}=1\times1\div B_2$ approximates to 0.1613, f to $_{e32}=1.4\times2\div B_2$ approximates to 0.4516 and f to $_{e42}=1\times1\div B_2$ approximates to 0.1613.

Thus, the weight coefficients $K_1$ through $K_4$ with respect to each of the CASE1 and CASE2 shown in FIGS. 1 and 2 are respectively selected.

If the pixel a shown in FIG. 1 is taken as the pixel f to be noted (CASE1), then weight coefficients $K_1$ through $K_4$ with respect to $e_{m-1,n-1}$, $e_{m,n-1}$, $e_{m+1,n-1}$ and $e_{m-1,n}$ respectively correspond to f to $e_{41}$ in the CASE11 and a numeric value of 0.2439, f to $e_{32}$ in the CASE12 and a numerical value of 0.4516, f to $e_{21}$ in the CASE11 and a numerical value of 0.2439, and f to e11 in the CASE11 and a numerical value of 0.3415.

If the pixel b shown in FIG. 2 is taken as the pixel f to be noted (CASE2), then weight coefficients $K_1$ through $K_4$ with respect to $e_{m-1,n-1}$, $e_{m,n-1}$, $e_{m+1,n-1}$ and $e_{m-1,n}$ respectively correspond to f to $e_{42}$ in the CASE12 and a numeric value of 0.1613, f to e31 in the CASE11 and a numerical value of 0.1707, f to e22 in the CASE12 and a numerical value of 0.1613, and f to e12 in the CASE12 and a numerical value of 0.2258.

Figure 6:
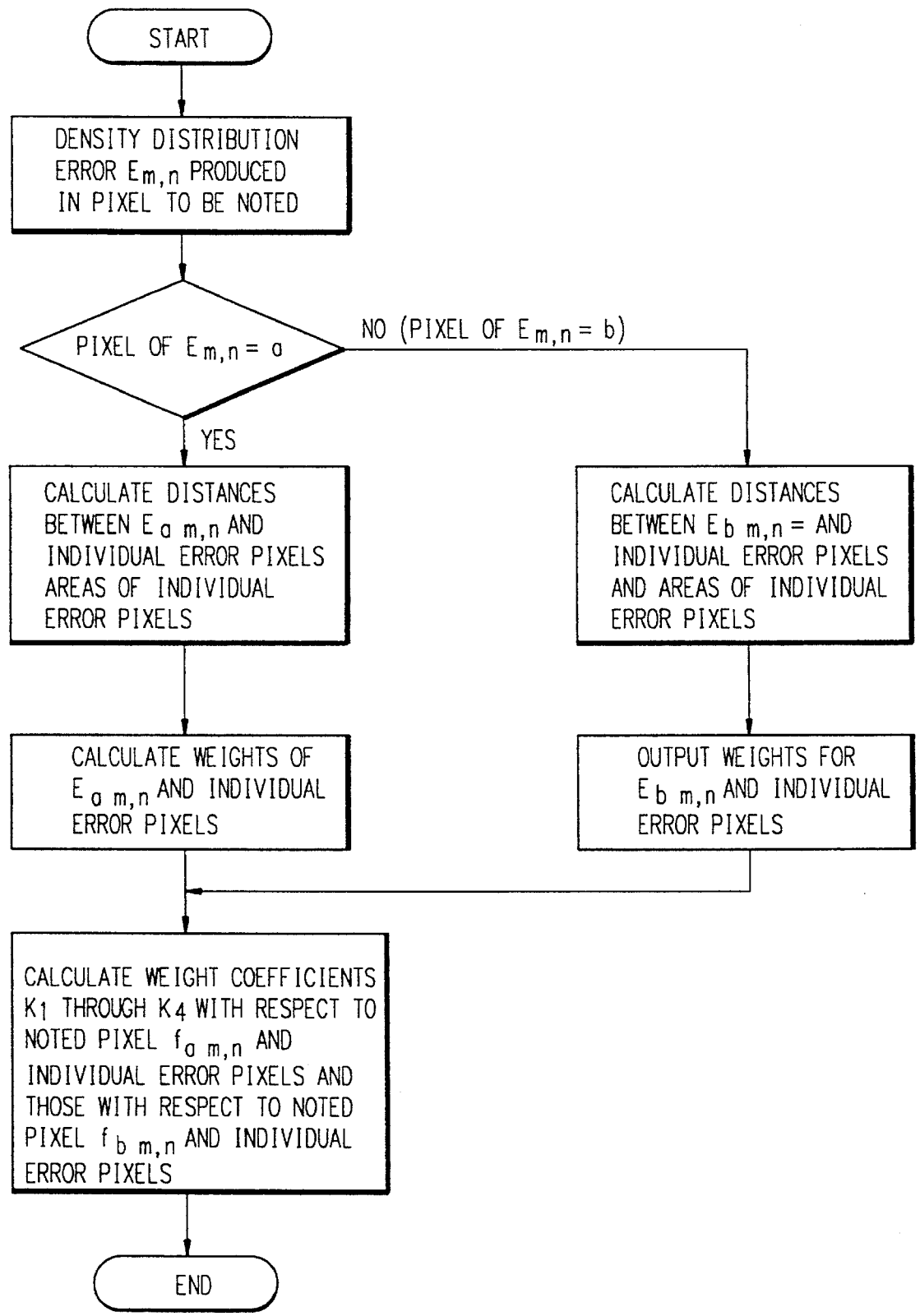
FIG. 6 is a flowchart for describing a process of calculating weight coefficient employed in the first embodiment of the present apparatus.

A process of calculating the weight coefficients $K_1$ through $K_4$ for each of the CASE1 and CASE2, which have been described above, is shown in a flowchart of FIG. 6.

The weight coefficient setting means 7 calculates the weight coefficients $K_1$ through $K_4$ at each of the CASE1 and CASE2 and stores therein the numerical values corresponding to the calculated weight coefficients. Next, the weight coefficients $K_1$ through $K_4$ corresponding to each of the CASE1 and CASE2 are read based on the select signal S1 outputted from the noted pixel selecting means 5 and are outputted to a propagation error calculating means 10.

Next, a threshold calculating means 12 calculates density thresholds $Th_1$ and $Th_2$ at each of the CASE1 and CASE2 and stores their corresponding numerical values therein. Halftone or intermediate tone of a pixel ranges from 0 to 255 levels of halftone. Accordingly, the adjacent two pixels a and b provide 510 levels of halftone in total. Further, since the ratio between the pixels is a:b=2:1 as described above, the thresholds $Th_1$ and $Th_2$ in the CASE1 and CASE2 become to $510\times\frac{2}{3}\div2=170$ and $510\times\frac{1}{3}\div2=85$.

Incidentally, the maximum density value A in the CASE1 becomes to $510\times\frac{2}{3}=340$. The maximum density value B in the CASE2 becomes to $510\times\frac{1}{3}=170$.

Further, the threshold calculating means 12 reads the corresponding thresholds for each of the CASE1 and CASE2 in response to the select signal S1 outputted from the noted pixel selecting means 5 and outputs the read thresholds to a binary digitizing means 17.

The propagation error calculating means 10 calculates each of errors E propagated onto the noted pixel f for each CASE from the following equation:

$$E=(K_1*e_{m-1,n-1})+(K_2*e_{m,n-1})+(K_3*e_{m+1,n-1})+(K_4*e_{m-1,n})$$

Since CASEs vary each time the adjacent pixels are scanned as the pixel f to be noted, values different from each other according to the respective CASEs are read from the weight coefficient setting means 7, so that propagation errors E1 and E2 are calculated according to the individual CASEs.

The $e_{m-1,n-1}$ through $e_{m-1,n}$ in the above equation correspond to density distribution errors produced in the respective peripheral pixels $f_{m-1,n-1}$ through $f_{m-1,n}$. They are used for obtaining the value of a density error signal S3 from a density distribution error calculating means 19 to be described later. Thus, an initial value of an error produced in each of the peripheral pixels is set to 0 (error 0) until each of the density distribution errors is calculated.

A rearranging means 15 adds each of the different propagation errors $E_1$ and $E_2$ obtained from the propagation error calculating means 10 according to the individual CASE1 and CASE2 to a density of the noted pixel f in accordance with each of the following equations to thereby rearrange the noted pixel into f'm,n. Thereafter, the rearranging means 15 outputs a density f' obtained after completion of the rearrangement of the pixel f to be noted to the binary digitizing means 17. Here, each sign $f_{m,n}$ in the following equations will show a pixel itself and a density of that pixel.

CASE1) $f'_{m,n}=f_{m,n}+E_1$

CASE2) $f'_{m,n}=f_{m,n}+E_2$

In accordance with each of the following equations, the binary digitizing means 17 compares the density rearranged by the rearranging means 15 with each of the thresholds $Th_1$ and $Th_2$ produced from the threshold calculating means 12 according to the individual CASE1 and CASE2 and converts the result of comparison into the digitized or binary form. Here, a number of "0" used to represent a scale of digitized levels shows white and a number of "1" shows black.

CASE1) when $f'_{m,n} \geq Th_1$ (threshold 170), $G_{m,n}$ is taken as being equal to "1" (black). When $f'_{m,n}<Th_1$, $G_{m,n}$ is taken as equal to "0" (white).

CASE2) when $f'_{m,n} \geq Th_2$ (threshold 85), $G_{m,n}$ is taken as being equal to "1" (black). When $f'_{m,n}<Th_2$, $G_{m,n}$ is taken as equal to "0" (white).

The binary digitized output is outputted from the binary digitizing means 17 as a binary digitized signal S2, which is used for turning ON and OFF a heating element corresponding to the pixel f (pixel a or b) to be noted.

The density distribution error calculating means 19 calculates density distribution errors $e_{m,n}$ for the pixel f to be noted, based on the density f' of the noted pixel rearranged by the rearranging means 15, the digitized level G produced from the binary digitizing means 17 and the maximum density values A and B of the individual pixels in accordance with the following equations. Incidentally, the maximum density values of the pixels A and B are respectively equal to 340 and 170.

CASE1) $e_{m,n} = f'_{m,n} - (G_{m,n} * A)$

CASE2) $e_{m,n} = f'_{m,n} - (G_{m,n} * B)$

Each of the so-calculated density distribution errors em,n for the noted pixel f is outputted to an unillustrated memory or storing means as a density error signal S3, which is subsequently used as the density distribution errors produced in the peripheral pixels with respect to a new pixel to be noted by scanning.

Accordingly, the propagation error calculating means 10 reads the stored value (density error signal S3) indicative of each density distribution error and calculates the propagation errors $E_1$ and $E_2$ according to the individual CASEs based on the result of reading.

Figure 7:
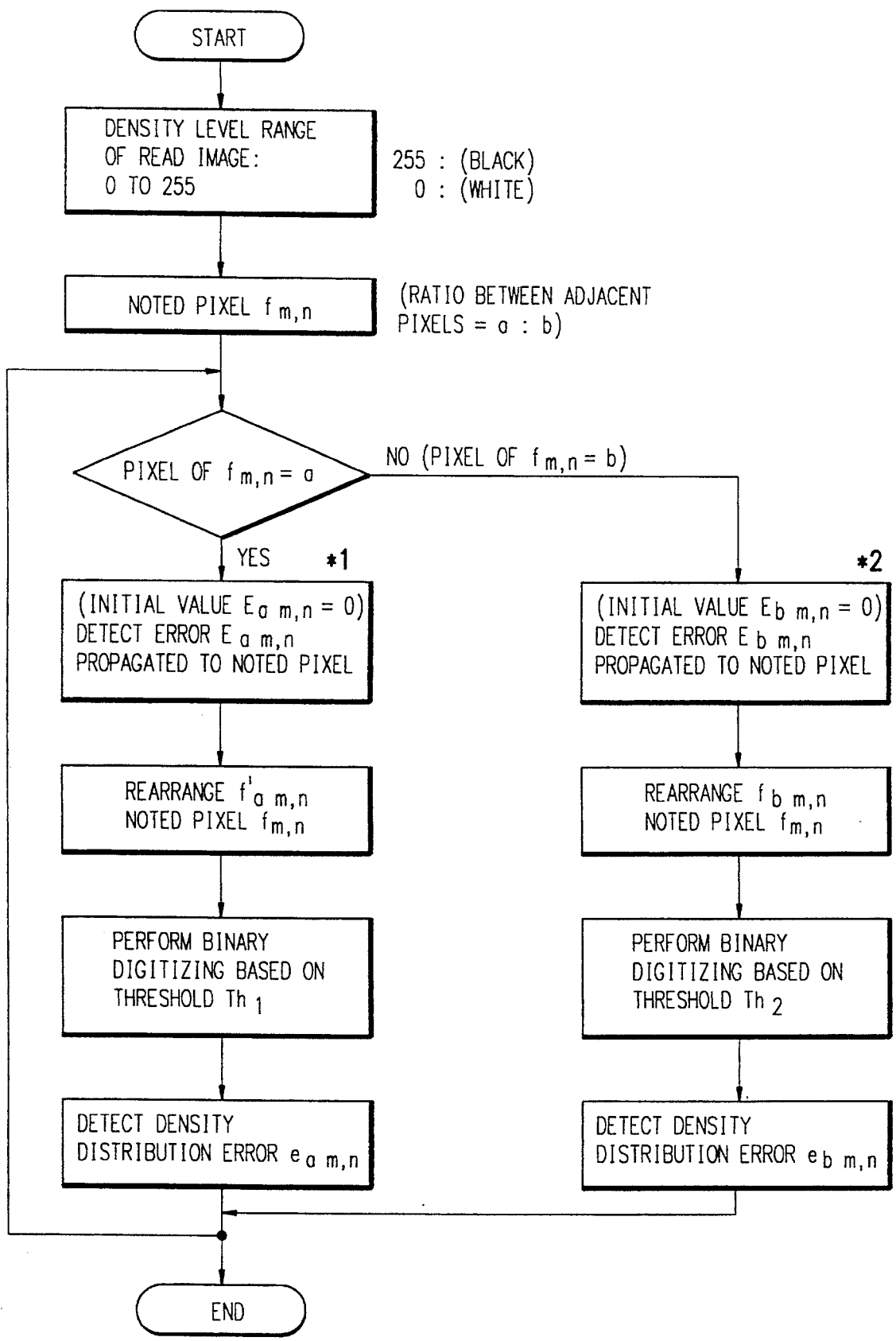
FIG. 7 is a flowchart for describing a computing process executed in the first embodiment of the present apparatus.

Incidentally, a process from the error calculation to the detection of the above density distribution errors is described in a flowchart shown in FIG. 7.

An image processing operation of the area method based on the above construction will next be described by specific examples.

An error diffusing method when individual pixels are scattered at predetermined densities (within a density level range of 0 to 255) in the form of dots as shown in FIG. 8, will first be described below.

When a pixel $f_{m,n}$ to be noted is a pixel a and belongs to a first pixel on one scanning line, the noted pixel corresponds to the CASE1.

1) The density of the pixel f to be noted is 76.
2) An error propagated to the noted pixel f is as follows:

$$E_1 = (K_1 * e_1) + (K_2 * e_2) + (K_3 * e_3) + (K_4 * e_4)$$
$$= (0.2439 * 0) + (0.4516 * 0) + (0.2439 * 0) + (0.3415 * 0) = 0$$

(Incidentally, weight coefficients $K_1$ through $K_4$ with respect to $e_1$ through $e_4$ respectively correspond to values read in the CASE1. Further, since no pixel equivalent to peripheral pixel with respect to the pixel f to be noted exist, the values of the density distribution errors $e_1$ through $e_4$ of the above equation are respectively 0 (=initial value)).

3) Rearrangement of the noted pixel f
Since $f'_{m,n} = f_{m,n} + E_1 = 76 + 0 = 76$, it remains unchanged
4) binary digitization
Since $f'_{m,n} < Th_1$ (170), $G_{m,n}$ is determined as equal to "0" (white) and its digitized output is outputted as the binary digitized signal S2.
5) Detection of each of the density distribution errors $$e_{m,n} = f'_{m,n} - G * A = 76 - 0 * 340 = 76$$

Thus, the density distribution error produced in the noted pixel $f_{m,n}$ is represented as 76, which is stored in the memory means as the density error signal S3.

A process of diffusing the error when a pixel b (which belongs to a second pixel on one scanning line: $f_{m+1,n}$) adjacent to the pixel a is scanned as the pixel f to be noted as shown in FIG. 8, will next be described.

1) The density of the pixel $f_{m+1,n}$ to be noted is 102.

2) An error propagated onto the noted pixel f is as follows:

$$E_2 = 0.1613 * 0 + 0.1707 * 0 + 0.1613 * 0 + 0.2558 * 76 = 17.1608$$

(At this time, weight coefficients $K_1$ through $K_4$ respectively correspond to values read in the CASE2).
3) Rearrangement of the noted pixel f $$f'_{m+1,n} = f_{m+1,n} + E_2 = 102 + 17.1608 = 119.1608$$

4) binary digitization
Since $f'_{m+1,n} > Th_2$ (85), $G_{m+1,n}$ is determined as equal to "1" (black) and its digitized output is outputted as the binary digitized signal S2.
5) Detection of each of the density distribution errors $$e_{m,n} = f'_{m,n} - G * B = 119.1608 - 1 * 170 = -50.8392$$

Thus, the density distribution error produced in the noted pixel $f_{m+1,n}$ is represented as −50.8392, which is stored in the memory means as the density error signal S3.

FIG. 9 is a view for describing levels G represented in digitized or binary form and density distribution errors e, both of which correspond to the two pixels described above.

Thus, the digitized levels G each outputted as the digitized signal S2 and the density distribution errors e each outputted as the density distribution error signal S3 may be successively re-stored in their corresponding scanned pixels to be noted, so as to form a corresponding list represented in the form of a table.

According to the area method described above, a high level of halftone can be obtained by diffusing the density distribution errors produced in the individual pixels into their corresponding peripheral pixels.

A second embodiment of the present invention will now be described. The second embodiment will be referred to as a "block method". Even in the case of the second embodiment, adjacent pixels a and b are provided with a predetermined ratio set therebetween as shown in FIG. 10 in a manner similar to the first embodiment. However, a density distribution error is calculated for each pixel (hereinafter called "pixel block") in which the two pixels a and b provided adjacent in a main scanning direction are set as a group or block.

Further, in the present embodiment, the ratio or a:b between the adjacent pixels a and b is represented as 2:1 in a manner similar to the first embodiment.

The pixels a and b represented in the block unit are used as a noted pixel block $F_{m,n}$ as one group. The pixel block F to be noted and the peripheral pixel blocks with respect to the noted pixel block F are set based on the fact that density distribution errors $E_{m-1,n-1}$, $E_{m,n-1}$, $E_{m+1,n-1}$, $E_{m-1,n}$ of the peripheral pixel blocks $F_{m-1,n-1}$, $F_{m,n-1}$, $F_{m+1,n-1}$, $F_{m-1,n}$ are transmitted or propagated to their corresponding noted pixel block ($F_{m,n}$) at a scanning end (corresponding to third and fourth pixels on the second scanning line). Therefore, a noted pixel selecting means 5 employed in the present embodiment selects one group of pixels a and b as a pixel block F to be noted in response to a scanning signal and outputs a select signal S1 therefrom.

A description will next be made to the calculation of weight coefficients $K_{11}$ through $K_{14}$. FIG. 11 shows the manner in which density distribution errors produced in a pixel block F to be noted are dispersed into their corresponding peripheral pixel blocks extending in four directions.

The weight coefficients $K_{11}$ through $K_{14}$ with respect to the density distribution errors $E_{m-1,n-1}$ through $E_{m-1,n}$ respectively produced in the peripheral pixel blocks are set and stored in a weight coefficient setting means 7 based on the distances from the center of the pixel block $F_{m,n}$ to be noted to the centers of the respective peripheral pixel blocks in accordance with the following operational equations. Since the pixels in the individual blocks are identical in area to each other, weights with respect to the areas can be omitted.

Now, the noted pixel block F can be represented in the form of densities of four patterns shown in FIGS. 12(a) through 12(d).

When the two pixels of a and b are taken as one block because the ratio a:b between the adjacent pixels a and b is equal to 2:1, the following values can be taken as density values, which can be represented within the block, so as to fall within a density range of 0 to 510. Namely, they are four patterns in total, which comprises a+b=510 (maximum density value of each of pixels a and b) shown in FIG. 12(a), a=340 (maximum density value of pixel a) shown in FIG. 12(b), b=170 (maximum density value of pixel b) shown in FIG. 12(c) and 0=0 (minimum density value) shown in FIG. 12(d).

Figure 13:
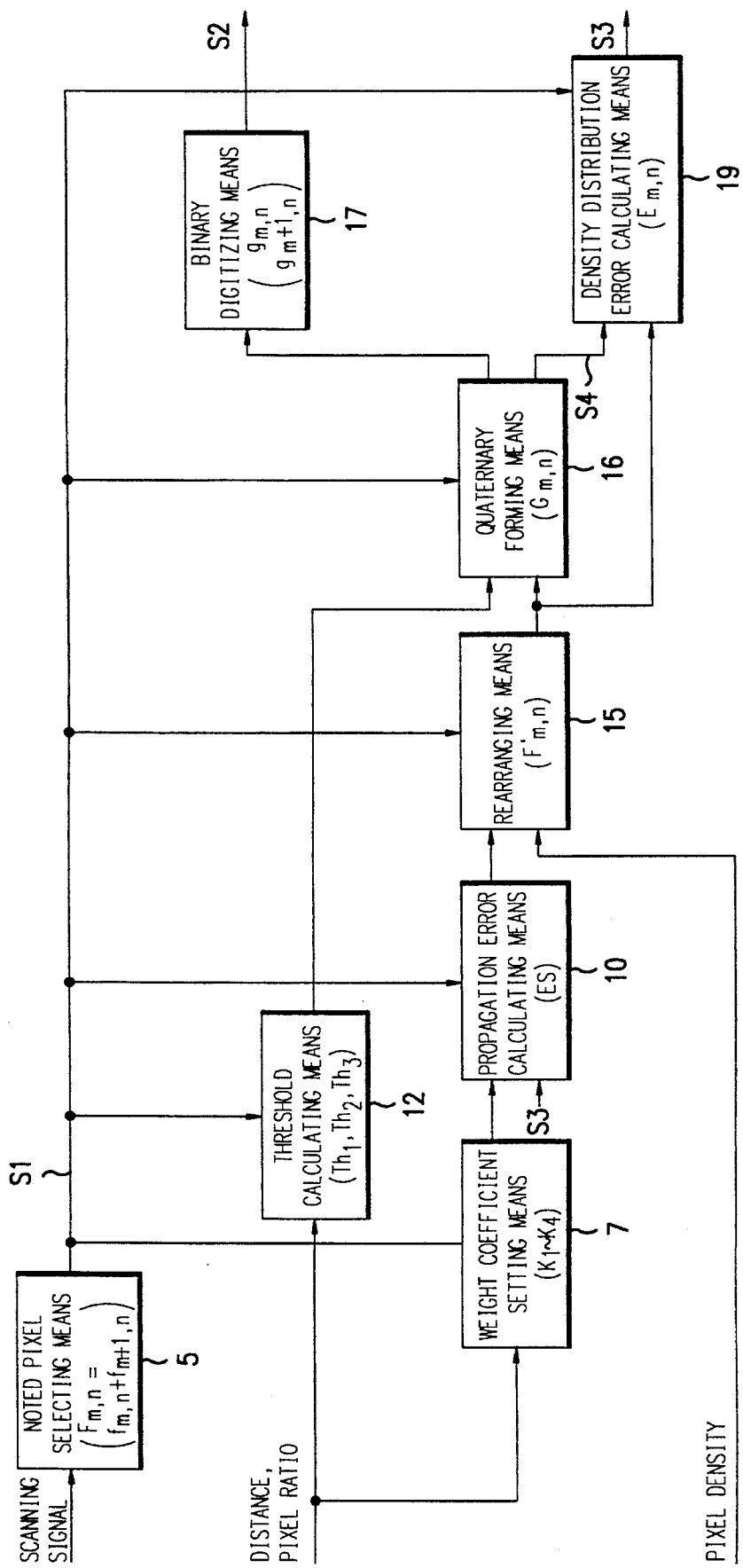
FIG. 13 is a block diagram showing the structure of the second embodiment of an image processing apparatus according to the present invention.

FIG. 13 is a block diagram showing an image processing apparatus using the block method of the second embodiment. In the same drawing, the same elements as those shown in FIG. 3 for the first embodiment are identified by like reference numerals and their description will therefore be omitted.

A threshold calculating means 12 calculates thresholds from intermediate values of the respective densities in accordance with the following equations.

$$Th_{11} = [(a + b) - a]/2 + a = 425$$
$$Th_{12} = (a - b)/2 + b = 255$$
$$Th_{13} = b/2 = 85$$

Weights necessary for diffusing errors produced in the pixel block Fm,n to be noted in four directions are represented in the form of (F to $E_{11}$):(F to $E_{21}$):(F to $E_{31}$):(F to $E_{41}$)=$5^{1/2}$:2:2*$5^{1/2}$:2 judging from the distances.

Thus, weight coefficients set to the noted pixel block F and the respective peripheral pixel blocks are obtained in consideration of the distances.

Since ES=$5^{1/2}$+2+2*$5^{1/2}$+2 approximates to 10.6, F to $E_{11}$, F to $E_{21}$, F to $E_{31}$ and F to $E_{41}$ are represented as follows:

F to $E_{11}$=$5^{1/2}$÷ES approximates to 11/53

F to $E_{21}$=2÷ES approximates to 10/53

F to $E_{31}$=2*$5^{1/2}$÷ES approximates to 22/53

F to $E_{41}$=2÷ES approximates to 10/53 where $5^{1/2}$ is taken as 2.2.

Thus, the weight coefficients $K_{11}$ through $K_{14}$ shown in FIG. 10 are represented as follows:

The weight coefficient $K_{11}$ set for $E_{m-1,n-1}$ corresponds to F to $E_{41}$ shown in FIG. 11, i.e., 10/53.

The weight coefficient $K_{12}$ set for $E_{m,n-1}$ corresponds to F to $E_{31}$, i.e., 22/53.

The weight coefficient $K_{13}$ set for $E_{m+1,n-1}$ corresponds to F to $E_{21}$, i.e., 10/53.

The weight coefficient $K_{14}$ set for $E_{m-1,n}$ corresponds to F to $E_{11}$, i.e., 11/53.

The weight coefficients $K_{11}$ through $K_{14}$ are actually set to values easy to be treated as fractional numbers to be described below and are stored in the weight coefficient setting means 7.

$K_{11}$=⅙, $K_{12}$=⅓, $K_{13}$=⅙, $K_{14}$=⅓

A propagation error calculating means 10 calculates each of errors ES to be propagated to the pixel block F to be noted in accordance with the following equation (initial value of ES=0).

$$ES = ⅙ * E_{m-1,n-1} + ⅓ * E_{m,n-1} + ⅙ * E_{m+1,n-1} + ⅓ * E_{m-1,n}$$

where $E_{m,n}$ shows the adjacent two pixels a and b, i.e., $e_{m,n} + e_{m,n+1}$.

A rearranging means 15 adds the propagation error ES obtained from the propagation error calculating means 10 to the density of the pixel block F to be noted to thereby rearrange the noted pixel block into $F'_{m,n}$. Thereafter, the rearranging means 15 outputs a density F' of the pixel block F, which is obtained after completion of the rearrangement of the pixel block F to be noted, to a quaternary forming means 16. Thereafter, the density F' is outputted to a binary digitizing means 17.

$$F'_{m,n} = F_{m,n} + ES$$

The quaternary forming means 16 compares the rearranged density F' of pixel block F to be noted with the thresholds $Th_{11}$ through $Th_{13}$ produced from the threshold calculating means 12, provide values in quaternary form according to the results of comparison and outputs the same as a signal S4 represented in quaternary form.

Result 1) in case of $F'_{m,n} \geq Th_{11}$ (threshold 425), $G_{m,n}$= "3". Further, the respective pixels in the pixel block F are $g_{m,n}$="1" (black) and $g_{m+1,n}$="1" black).

Result 2) in case of $Th_{12}$ (threshold 255)$\leq F'_{m,n} \leq Th_{11}$, $G_{m,n}$="2". Further, the respective pixels in the pixel block F are $g_{m,n}$="1" (black) and $g_{m+1,n}$="0" (white).

Result 3) in case of $Th_{13}$ (threshold 85)$\leq F'_{m,n} Th_{12}$, $G_{m,n}$="1". Further, the respective pixels in the pixel block F are $g_{m,n}$="0" (white) and $g_{m+1,n}$="1" (black).

Result 4) in case of $F'_{m,n} < Th_{13}$, Gm,n="0". Further, the respective pixels in the pixel block F are $g_{m,n}$="0" (white) and $g_{m+1,n}$="0" (white).

The four results are established so as to correspond to the density representations of the four patterns shown in FIGS. 12(a) through 12(d). As a result, the quaternary-formed signal S4 is produced according to each of the four patterns.

Each output $G_{m,n}$ represented in the quaternary form is of a level represented in the quaternary form for the pixel block to be noted as a unit and is outputted to a density distribution error calculating means 19 as the signal S4.

The binary digitizing means 17 is inputted with the quaternary-formed signal S4 and outputs digitized levels $g_{m,n}$ and $g_{m+1,n}$ as a unit of the pixels a and b in the pixel block to be noted in response to the quaternary-formed signal S4.

Result 1) when the signal S4 is $G_{m,n}$="3" the respective pixels in the noted pixel block are $g_{m,n}$="1" (black) and $g_{m+1,n}$="1" (black).

Result 2) when the signal S4 is $G_{m,n}$="2", the respective pixels in the noted pixel block are $g_{m,n}$="1" (black) and $g_{m+1,n}$="0" (white).

Result 3) when the signal S4 is $G_{m,n}$="1", the respective pixels in the noted pixel block are $g_{m,n}$="0" (white) and $g_{m+1,n}$="1" (black).

Result 4) when the signal S4 is $G_{m,n}$="0", the respective pixels in the noted pixel block are $g_{m,n}$="0" (white) and $g_{m+1,n}$="0" (white).

The digitized signal S2 is used for turning ON and OFF of the heating elements corresponding to the pixels fm,n (pixel a or b), $f_{m+1,n}$ (pixel b or a) in a printing unit provided at a subsequent stage.

In accordance with the following equation, the density distribution error calculating means 19 calculates a density distribution error Em,n with respect to the pixel block F to be noted, based on the density F' of the noted pixel block F rearranged by the rearranging means 15, the signal level G represented in the quaternary form, which is produced from the quaternary forming means 16 and the maximum density values A and B of the individual pixels. Incidentally, the maximum density values of the individual pixels A and B are respectively equal to 340 and 170.

$$E_{m,n} = F'_{m,n} - G*(A+B)/3$$

The density distribution error Em,n of the noted pixel block F, which has been calculated in the above-described manner, is outputted to an unillustrated storing means as a density error signal S3, which is subsequently used as an density distribution error produced in peripheral pixel blocks with respect to a new pixel F to be noted by scanning.

The propagation error calculating means 10 reads the stored values indicative of the density distribution errors and calculates each of propagation errors ES based on the result of reading.

Figure 14:
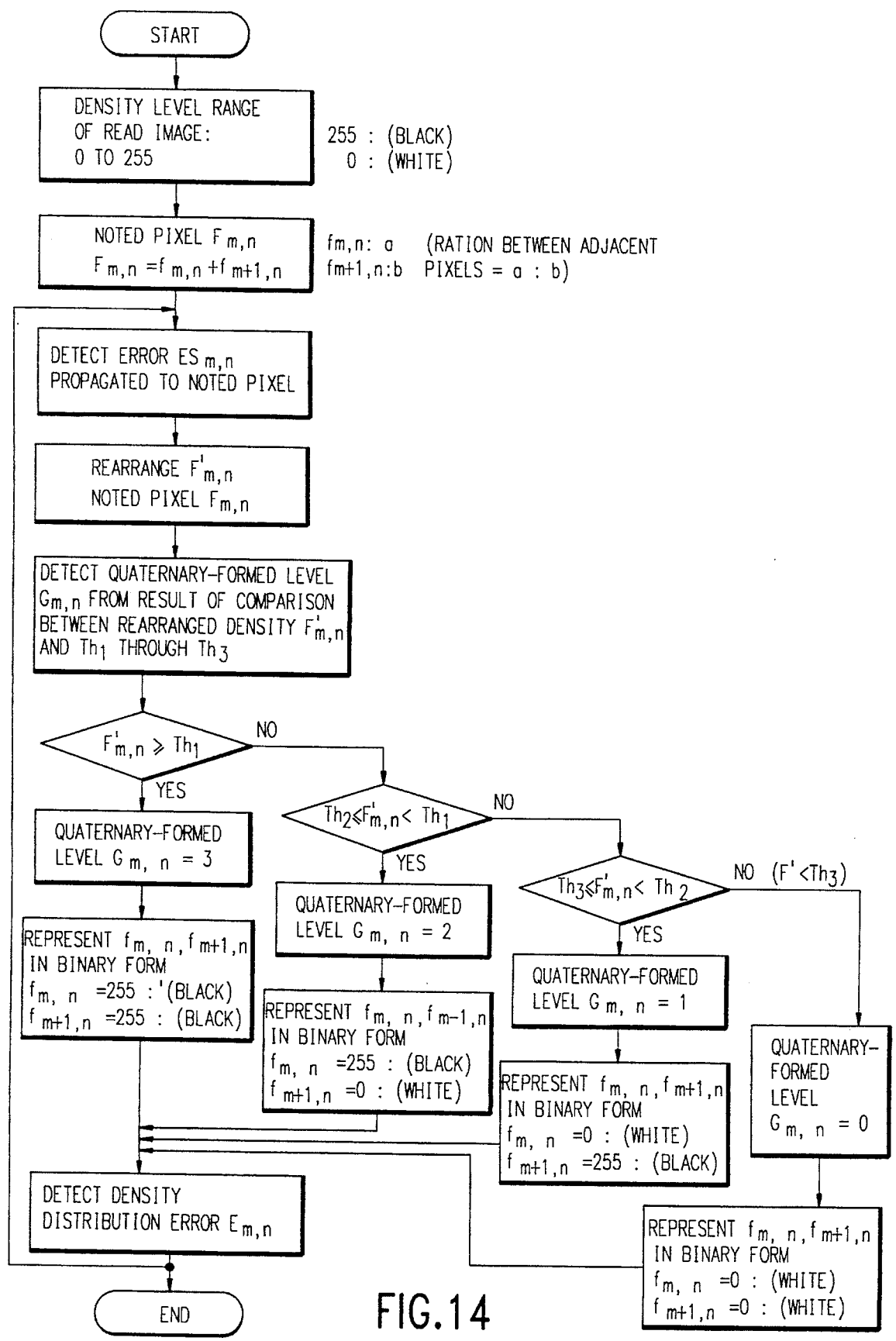
FIG. 14 is a flowchart for describing a computing process executed in the second embodiment of the apparatus shown in FIG. 13.

Incidentally, a process of the detection of the above density distribution errors is described in a flowchart shown in FIG. 14.

An image processing operation of the block method based on the above construction will next be described with reference to a specific example. Now, respective pixels are scattered at predetermined densities in the form of dots as shown in FIG. 15.

When the pixel block Fm,n to be noted is first and second pixels ($f_{m,n}$ $f_{m+1,n}$) on one scanning line extending in a main scanning direction, 1) the density of the pixel block $F_{m,n}$ to be noted is $f_{m,n} + f_{m+1,n} = 76 + 102 = 178$.

2) an error propagated onto the noted pixel block F is as follows:

$$\begin{aligned} ES &= (K_{11}*E_1) + (K_{12}*E_2) + (K_{13}*E_3) + (K_{14}*E_4) \\ &= (1/6*0) + (1/3*0) + (1/3*0) + (1/3*0) = 0 \end{aligned}$$

(Incidentally, weight coefficients K11 through K14 with respect to E1 through E4 respectively correspond to values read in the CASE1. Further, the values of E1 through E4 in the above equation are respectively 0 (=initial value)).

3) rearrangement of the noted pixel block F is $F'_{m,n} = F_{m,n} + ES = 178 + 0 = 178$, so that it remains unchanged. 4) quaternary formation and binary digitization are as follows:

Since $Th_{13}(85) \leq F'_{m,n}(178) < Th_{12}(55)$ because of F'=178, $G_{m,n}$ is determined as equal to "2" (black), which is outputted as a signal S4 represented in the quaternary form.

Further, in case of $g_{m,n}$="0" (white) and $g_{m+1,n}$="1" (black), they are outputted as a signal S2 represented in the binary form.

5) detection of each of the density distribution errors is:

$$E_{m,n} = F'_{m,n} - G_{m,n}*(A+B)/3 = 178 - 170 = 8$$

Thus, the density distribution error produced in the noted pixel $F_{m,n}$ is represented as 8, whose value is stored in a memory or storing means as a density error signal S3.

A process of diffusing errors when a pixel block (corresponding to third and fourth pixels on one scanning line in a main scanning direction: $f_{m+2,n}$, $F_{m+3,n}$) adjacent to the above pixel block is scanned as the noted pixel block F shown in FIG. 15, will now be described below.

1) The density of a noted pixel block $F_{m+1,n}$($f_{m+2,n}$, $f_{m+3,n}$) is 128 +178=306.

2) An error propagated onto the noted pixel block F is as follows:

ES=⅙*0+⅓*0+⅙*0+⅓*8=2.66 (At this time, only a density distribution error value produced in a peripheral pixel block E4 with respect to the pixel block F to be noted exists).

3) Rearrangement of the noted pixel block F $$F'_{m+1,n} = F_{m+1,n} + ES = 306 + 2.66 = 308.66$$

4) Quaternary formation and binary digitization

Since the equation is $Th_{12}(255) \leq F'_{m+1,n}(308.66) < Th_{11}(425)$, Gm,n is determined as equal to "3" (black), which is outputted as a signal S4 represented in the quaternary form. Further, $g_{m+2,n}$="1" (black) and $g_{m+3,n}$="0" (white). Each of them is outputted as a signal S2 represented in the binary form.

5) Detection of each density distribution error $$E_{m,n} = F'_{m,n} - G_{m,n}*(A+B)/3 = 308.66 - 340 = -31.34$$

Thus, the density distribution error for the pixel block $F_{m+1,n}$ to be noted is represented as −31.34. This value is stored in the memory means as a density error signal S3.

FIG. 16 is a view for describing the manner in which levels G represented in the quaternary form, levels g represented in the digitized or binary form and density distribution errors E with respect to the two noted pixel blocks described above are stored in a table form.

According to the above-described block method, the adjacent pixels a and b are taken as one pixel. Further, the density distribution errors produced in the individual pixels can be propagated onto their corresponding peripheral pixels so as to obtain high levels of halftone.

Figure 17:
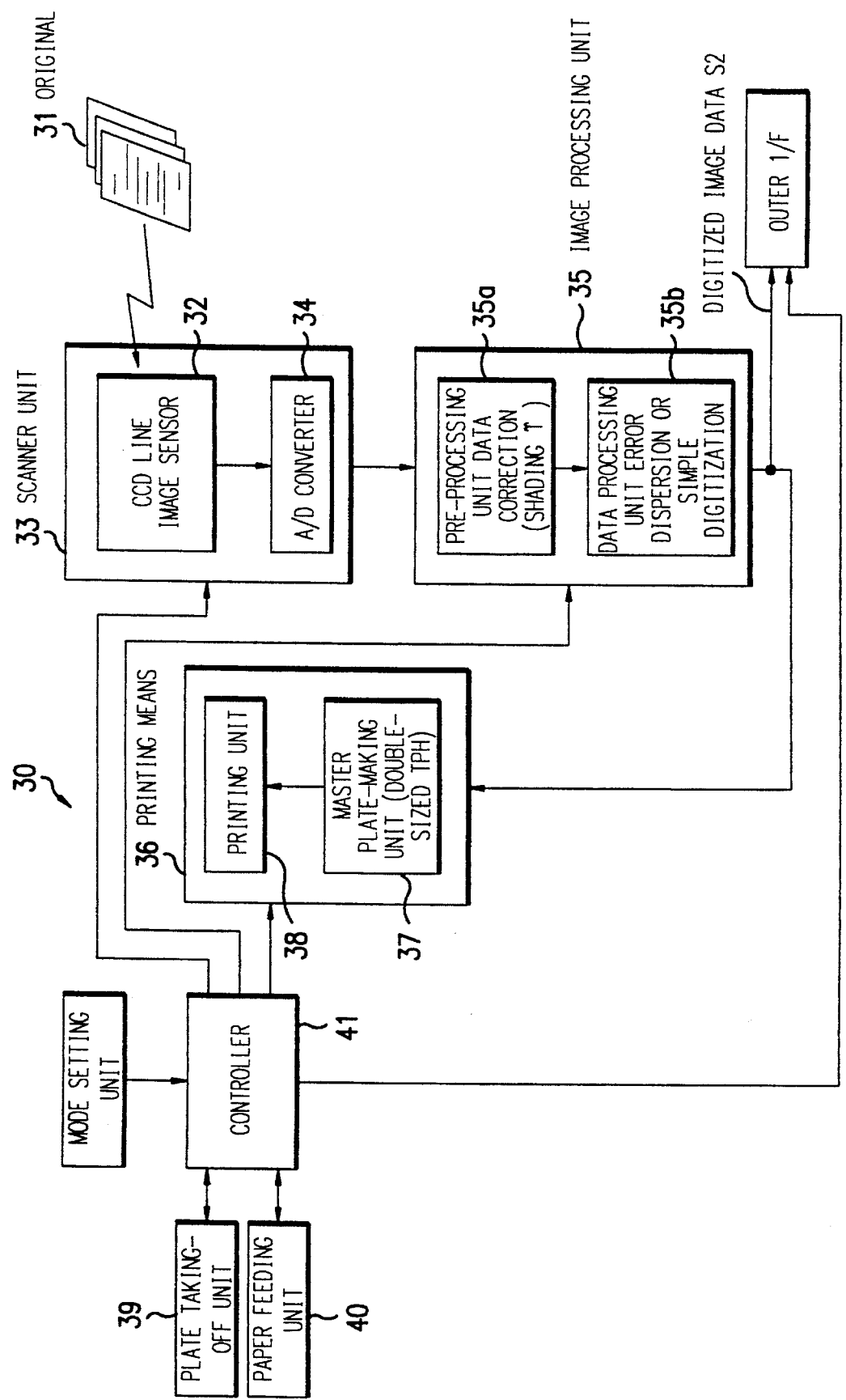
FIG. 17 is a block diagram illustrating one example of the application of the present apparatus to a stencil printer.
Figure 18:
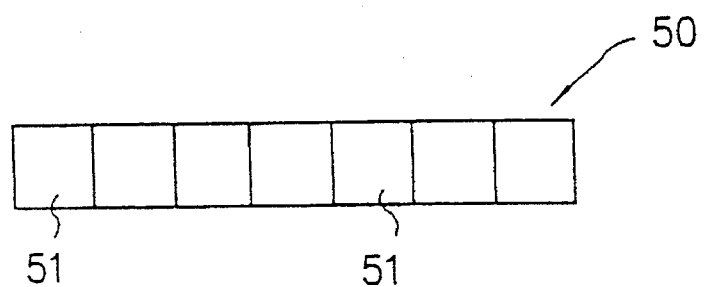
FIG. 18 is a view for describing a thermal head comprised of heating elements adjacent to each other, which are identical in size to each other.
Figure 19:
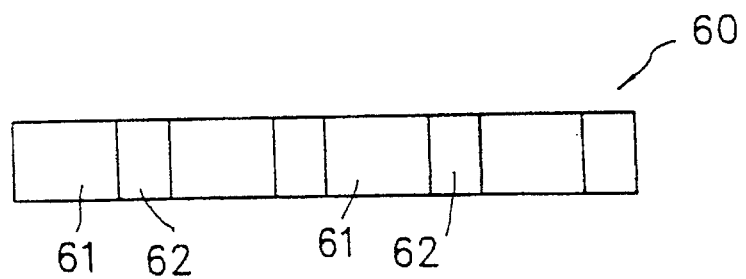
FIG. 19 is a view for describing a thermal head comprised of heating elements adjacent to each other, which are different in size from each other.

The image processing apparatus 1, which has been described in each of the respective embodiments, is applied to a stencil printer 30 shown by a block diagram of FIG. 17.

In the stencil printer 30, a scanner unit 33 having an image sensor 32 reads or scans an original 31 and outputs data read from the original 31 to an image processing unit 35 through an A/D converter 34.

In the image processing unit 35, a pre-processing unit 35a makes a data correction such as shading or the like on the output of the scanner unit 33. Thereafter, a data processing unit 35b makes image processing on the data, using the aforementioned error diffusion method.

Data S2 represented in a digitized or binary form, which is outputted to the outside from the image processing unit 35, is outputted to a printing means 36. The printing means 36 comprises a plate-making unit 37 and a printing unit 38. The plate-making unit 37 makes a stencil original or plate with respect to an image on the original 31 in accordance with a thermal process.

At this time, a thermal means (thermal head 60) whose adjacent heating elements are different in size from each other drives and controls the heating elements, based on the signal S2 so as to correspond to digitized levels of the pixels a and b. The printing unit 38 has a rotating drum on which the processed stencil original has been applied. Printing paper is fed to a plate cylinder while the rotating drum is being rotated and ink is discharged from the inside of the rotating drum, whereby an image is formed on the printing paper with the ink which passed through the stencil original.

Further, the stencil printer 30 is provided with a plate taking-off unit 39 for separating an used stencil original from the rotating drum and a paper feeding unit 40 for supplying the printing paper. Incidentally, the respective components are generally controlled by a controller 41.

The image processing apparatus described above can also be applied to one other than the stencil printer. Namely, so long as an apparatus having a printing unit with heating elements whose area ratio is different from each other, such as an arrangement in which the signal S2 is outputted to a printer having simply a thermal head, etc., is used, then operations and effects similar to those described above can be obtained even in either case.

Incidentally, each of the above embodiments describes the case where the ratio between the adjacent pixels (heating elements) is set as 2:1. However, the ratio between the pixels is not necessarily limited to or by 2:1. Alternatively, other ratio may be used.

According to the present invention, an error diffusion method of propagating density distribution errors produced in peripheral pixels with respect to a noted pixel in an image comprised of two pixels adjacent in a main scanning direction and different in size from each other can be constructed in a simple procedure and with ease.

In the method and the apparatus, when each of pixels is selected as a pixel to be noted and propagation errors for propagating density distribution errors produced in peripheral pixels with respect to the selected noted pixel are determined, areas of the respective pixels and distances from the individual peripheral pixels to the pixel to be noted are taken into consideration as weights. After the propagation errors have been obtained, the resulting error outputs are represented in the binary form so as to obtain the density distribution errors. Thus, representations of the multi levels of halftone can be specifically created while characteristics of the multi levels of halftone with respect to an image of adjacent two pixels different in size from each other are efficiently used.

In the method and the apparatus, a pair of adjacent pixels is selected as a pixel block to be noted, which is formed by combining the adjacent pixels. Subsequently, the above computing process is performed with the noted pixel block as a unit. The same effect as that described above can be obtained.

By using the image processing method and the image processing apparatus, each of the heating elements different in size from each other, which form a thermal head, can be optimally controlled, so that multi levels of halftone can be created onto a recording sheet.

Having now fully described the invention, it will be apparent to those skilled in the art that many changes and modifications can be made without departing from the spirit or scope of the invention as set forth herein.

What is claimed is:

1. A method of electrically processing an image using an error diffusion method in which the image is divided into pixels different in areas and extending in main and sub scanning directions, density distribution errors being formed in peripheral pixels around a noted pixel in the image, said method comprising:

calculating thresholds of densities corresponding to area ratios from the peripheral pixels to the noted pixel;

selecting a noted pixel and peripheral pixels around the noted pixel scanned already;

calculating propagated errors propagated to the noted pixel from the density distribution errors formed in the peripheral pixels based on distances from the noted pixel to the respective peripheral pixels and the area ratios;

adding the propagated errors to a density of the noted pixel to form a rearranged density of the noted pixel; and comparing the rearranged density of the noted pixel with the thresholds to obtain a binary level for the noted pixel.

2. A method according to claim 1, further comprising, after obtaining the binary level for the noted pixel, obtaining a new density distribution error for the noted pixel based on the area ratios from the noted pixel to the peripheral pixels, the rearranged density of the noted pixel and the binary level, said new density distribution error being used for calculating propagated errors as a peripheral pixel.

3. A method according to claim 2, wherein said new density distribution error and said thresholds of the densities are memorized in a memory when calculating the noted pixels.

4. A method according to claim 3, wherein four peripheral pixels around the noted pixel are considered to one noted pixel when calculating the propagated errors, three peripheral pixels out of said four peripheral pixels being located in a previous main scanning line in a sub scanning direction, and one peripheral pixel out of said four peripheral pixels being located in a main scanning line adjacent to the noted pixel.

5. A method of electrically processing an image using an error diffusion method in which the image is divided into pixels different in areas and extending in main and sub scanning directions, density distribution errors being formed in peripheral pixels around a noted pixel in the image, said method comprising:

calculating thresholds of densities of two adjacent pixels according to combined patterns of the two pixels;

selecting a noted pixel block formed of a pair of two adjacent pixels, and peripheral pixel blocks around the noted pixel block scanned already;

calculating propagated errors propagated to the noted pixel block from the density distribution errors formed in the peripheral pixel blocks based on distances from the noted pixel block to the respective peripheral pixels block;

adding the propagated errors to a density of the noted pixel block to form a rearranged density of the noted pixel block; and comparing the rearranged density of the noted pixel block with the thresholds to obtain a binary level for the noted pixel block.

6. A method according to claim 5, further comprising, after obtaining the binary level for the noted pixel block, obtaining a new density distribution error for the noted pixel block based on the combined pattern of density of the two pixels, the rearranged density of the noted pixel block and a value obtained by said comparing of the rearranged density of the noted pixel block with the thresholds, said new density distribution error being used for calculating propagated errors as a peripheral pixel block.

7. A method according to claim 6, wherein said new density distribution error and said thresholds of the densities are memorized in a memory when calculating the noted pixel block.

8. A method according to claim 7, wherein four peripheral pixel blocks around the noted pixel block are considered to one noted pixel block when calculating the propagated errors, three peripheral pixel blocks out of said four peripheral pixel blocks being located in a previous main scanning line in a sub scanning direction, and one peripheral pixel block out of said four peripheral pixel blocks being located in a main scanning line adjacent to the noted pixel block.

9. An image processing apparatus using an error diffusion method in which an image is divided into pixels different in areas and extending in main and sub scanning directions, density distribution errors being formed in peripheral pixels around a noted pixel in the image, said apparatus comprising:

means for outputting an image scanning signal;

noted pixel selecting means for successively selecting one of the pixels different in area as a noted pixel based on the image scanning signal to output a select signal, peripheral pixels being automatically set around the noted pixel;

weight coefficient setting means connected to the noted pixel selecting means and computing weight coefficients for the noted pixel and the peripheral pixels based on area ratios among said noted and peripheral pixels and distances from the noted pixel to the respective peripheral pixels, said weight coefficient setting means outputting the weight coefficients in response to the selected signal outputted from said noted pixel selecting means;

threshold calculating means connected to the noted pixel selecting means, said threshold calculating means calculating thresholds of densities for selecting digitized levels of the pixels according to the area ratios among the pixels, said threshold calculating means outputting the thresholds according to the noted pixel in response to the select signal;

propagation error calculating means connected to the weight coefficient setting means, said propagation error calculating means computing propagated errors propagated to the noted pixel from the density distribution errors formed in the peripheral pixels based on the weight coefficients outputted from said weight coefficient setting means;

rearranging means connected to the propagation error calculating means for adding the propagated errors to a density of the noted pixel to form a rearranged density of the noted pixel; and digitizing means connected to the threshold calculating means and the rearranging means, said digitizing means comparing the rearranged density of the noted pixel with the thresholds outputted from the threshold calculating means to obtain a binary level for the noted pixel and outputting the binary level.

10. An apparatus according to claim 9, further comprising density distribution error calculating means connected to the noted pixel selecting means, digitizing means and rearranging means, said density distribution error calculating means obtaining a new density distribution error corresponding to the noted pixel based on the area ratios from the noted pixel to the peripheral pixels, the rearranged density of the noted pixel and the binary level, said new density distribution error being used for calculating the propagated errors as a peripheral pixel in the propagation error calculating means.

11. An apparatus according to claim 10, further comprising a memory for memorizing said density distribution error and said thresholds of the densities, which are used when calculating the noted pixel.

12. An apparatus according to claim 11, further comprising means for providing said density distribution errors for four peripheral pixels relative to one noted pixel to the propagation error calculating means when calculating the propagated errors, said density distribution errors being memorized in said memory, three peripheral pixels out of said four peripheral pixels being located in a previous main scanning line in a sub scanning direction, and one peripheral pixel out of said four peripheral pixels being located in a main scanning line adjacent to the noted pixel.

13. An image processing apparatus using an error diffusion method in which an image is divided into pixels different in areas and extending in main and sub scanning directions, density distribution errors being formed in peripheral pixels around a noted pixel in the image, said apparatus comprising:

means for outputting an image scanning signal;

noted pixel selecting means for successively selecting a set of the pixels different in areas as a noted pixel block based on the image scanning signal to output a select signal, peripheral pixel blocks being automatically set around the noted pixel;

weight coefficient setting means connected to the noted pixel selecting means and computing weight coefficients for the noted pixel block and the peripheral pixel blocks based on distances from the noted pixel block to the respective peripheral pixel blocks, said weight coefficient setting means outputting the weight coefficients in response to the selected signal outputted from said noted pixel selecting means;

threshold calculating means connected to the noted pixel selecting means, said threshold calculating means calculating thresholds of densities according to the density of the noted pixel block in response to the select signal;

propagation error calculating means connected to the weight coefficient setting means, said propagation error calculating means computing errors propagated to the noted pixel block from the density distribution errors formed in the peripheral pixel blocks based on the weight coefficients outputted from said weight coefficient setting means;

rearranging means connected to the propagation error calculating means for adding the propagated errors to a density of the noted pixel block to form a rearranged density of the noted pixel block;

quaternary forming means connected to the rearranging means and the threshold calculating means, said quaternary forming means comparing the rearranged density with the thresholds outputted from said threshold calculating means, and selecting and outputting a signal represented in quaternary form indicative of a quaternary-formed level of the noted pixel block; and digitizing means connected to the quaternary forming means, said digitizing means selecting and outputting a binary signal indicative of digitized levels of the pixels in the noted pixel block based on the signal outputted from the quaternary forming means.

14. An apparatus according to claim 13, further comprising density distribution error calculating means connected to the quaternary forming means, said distribution error calculating means calculating a new density distribution error corresponding to the noted pixel block based on the rearranged density by the rearranging means and the quaternary-formed level by the quaternary forming means, said new density distribution error being used for calculating the propagated errors as a peripheral pixel block in the propagation error calculation means.

15. An apparatus according to claim 14, further comprising a memory for memorizing said density distribution errors and said thresholds of the densities, which are used when calculating the noted pixel block.

16. An apparatus according to claim 14, further comprising means for providing said density distribution errors for four peripheral pixel blocks relative to one noted pixel block to the propagation error calculating means when calculating the propagated errors, said density distribution errors being memorized in said memory, three peripheral pixel blocks out of said four peripheral pixel blocks being located in a previous main scanning line in a sub scanning direction, and one peripheral pixel block out of said four peripheral pixel blocks being located in a main scanning line adjacent to the noted pixel block.

* * * * *